United States Patent
Sjöland et al.

(10) Patent No.: US 12,262,322 B2
(45) Date of Patent: Mar. 25, 2025

(54) WAKEUP COMMUNICATION IN A WIRELESS COMMUNICATION SYSTEM

(71) Applicant: Telefonaktiebolaget LM Ericsson (publ), Stockholm (SE)

(72) Inventors: Henrik Sjöland, Lund (SE); Leif Wilhelmsson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 413 days.

(21) Appl. No.: 17/780,178

(22) PCT Filed: Dec. 2, 2019

(86) PCT No.: PCT/EP2019/083293
§ 371 (c)(1),
(2) Date: May 26, 2022

(87) PCT Pub. No.: WO2021/110233
PCT Pub. Date: Jun. 10, 2021

(65) Prior Publication Data
US 2022/0417852 A1 Dec. 29, 2022

(51) Int. Cl.
*H04W 52/00* (2009.01)
*H04B 1/40* (2015.01)
(Continued)

(52) U.S. Cl.
CPC .......... *H04W 52/0229* (2013.01); *H04B 1/40* (2013.01); *H04W 76/28* (2018.02)

(58) Field of Classification Search
CPC ..... H04W 52/0229; H04W 76/28; H04B 1/40
See application file for complete search history.

(56) References Cited

U.S. PATENT DOCUMENTS

| | | |
|---|---|---|
| 2012/0163422 A1 | 6/2012 | Lee et al. |
| 2017/0332327 A1 | 11/2017 | Fang et al. |

(Continued)

FOREIGN PATENT DOCUMENTS

| | | |
|---|---|---|
| CN | 107735975 A | 2/2018 |
| CN | 107820721 A | 3/2018 |

(Continued)

OTHER PUBLICATIONS

Bryant, Carl, et al., "A 2.45GHz, 50uW Wake-up Receiver Front-end with -88dBm Sensitivity and 250kbps Data Rate", Proceedings of European Solid State Circuits Conference (ESSCIRC), 2014, 235-238.

*Primary Examiner* — Erika A Washington
(74) *Attorney, Agent, or Firm* — Murphy, Bilak & Homiller, PLLC

(57) ABSTRACT

A wireless communication device (100) comprises a first transceiver (110) comprising a first frequency synthesizer (112) which comprises a first digitally controlled oscillator (DCO1) and a crystal oscillator (XO). The wireless communication device (100) further comprises a second transceiver (120) comprising a wakeup receiver (Rx2), a second transmitter (Tx2) and a second digitally controlled oscillator (DCO2) connected to the wakeup receiver (Rx2) and second transmitter (Tx2). The wireless communication device (100) further comprises a control unit (170) configured to control operation of the wireless communication device. The second transmitter (Tx2) is configured to transmit periodically a signal to a base station. The signal is modulated by a code identifying the wireless communication device (100) and transmitted at a frequency set by the second digitally controlled oscillator (DCO2).

14 Claims, 3 Drawing Sheets

(51) Int. Cl.
*H04W 52/02* (2009.01)
*H04W 76/28* (2018.01)

(56) References Cited

U.S. PATENT DOCUMENTS

2019/0261268 A1    8/2019  Zhou et al.
2022/0232473 A1*   7/2022  Son .................. H04W 52/0216

FOREIGN PATENT DOCUMENTS

| | | |
|---|---|---|
| CN | 109842925 A | 6/2019 |
| CN | 110326335 A | 10/2019 |
| CN | 110383701 A | 10/2019 |
| EP | 3047619 B1 | 8/2018 |
| JP | 2002152129 A | 5/2002 |
| JP | 2007082057 A | 3/2007 |
| JP | 2010118855 A | 5/2010 |
| JP | 2015529412 A | 10/2015 |
| KR | 20010109475 A | 12/2001 |
| KR | 20140087028 A | 7/2014 |
| KR | 20170080587 A | 7/2017 |
| KR | 20180014735 A | 2/2018 |
| KR | 20190116425 A | 10/2019 |
| WO | 2015042362 A1 | 3/2015 |
| WO | 2018166638 A1 | 9/2018 |

\* cited by examiner (a)

(b)

(c)

WAKEUP COMMUNICATION IN A WIRELESS COMMUNICATION SYSTEM

TECHNICAL FIELD

Embodiments herein relate to a wireless communication device, a base station and method therein for wakeup communication in a wireless communication system. In particular, the embodiments herein relate to a wakeup transceiver in the wireless communication device and wakeup communication between the wakeup transceiver and the base station.

BACKGROUND

There is a strong trend in wireless communication systems towards supporting devices with ultra-low power consumption. These devices may be small sensor nodes where a battery should last many years, or where energy scavenging is used to achieve battery-less operation. When the wireless communication system is to communicate with such devices a receiver must be operated in the device. To achieve a short response time, the receiver must be operated regularly. The power consumption of the receiver must then be limited. A special ultra-low power dedicated receiver, so called wakeup receiver, is thus often used. However, the capabilities of the wakeup receiver are limited, and it is only able to detect the presence of a wakeup request. When such a request is present a higher performance and higher power main receiver is started to be able to receive the actual communication.

To achieve ultra-low power consumption, e.g. below 100 uW, the wakeup receivers are often based on amplitude detection of on-off keying (OOK) signals. Generation of accurate local oscillator (LO) signals using power hungry Phase Locked Loops (PLLs) can thereby be avoided. However, since the frequency of the LO signal from a free-running oscillator is not accurate, only modest filtering can be realized prior to amplitude detection.

Due to the limited amount of filtering prior to amplitude detection the wakeup receivers are very vulnerable to interference. All interference and noise entering the amplitude detector having amplitude modulation in the same frequency range as the wakeup signal will mask the wakeup signal. It should here be understood that the same frequency does not imply that the interference is sent using the same frequency channel. Instead, because of the limited ability to filter out signals adjacent to the wakeup signal, it should be understood that also signals transmitted in adjacent frequency channels and potentially even further away will effectively have as detrimental effect as a co-channel interferer. Alternatively, to be able to effectively filter out adjacent interference, the frequency generation must have high accuracy and consume significant power.

Furthermore, the amplitude detector is also highly non-linear and therefore produces very small outputs for weak input signals. Assuming the amplitude detector has a quadratic characteristic for small signals means that the signal to noise ratio falls of by 20 dB for each reduction of 10 dB of the input signal level. This becomes quickly very unfavorable already with modest amounts of interference at the detector input, as the presence of interference will limit how much the input signal can be amplified. More filtering prior to the amplitude detection is therefore necessary to achieve wakeup receivers with high immunity to interference. However, to employ such filtering an accurate frequency LO signal is needed, so means to create such signals with low power consumption must thus be provided.

SUMMARY

It is therefore an object of embodiments herein to provide an improved method and apparatus for wakeup communication between a wireless communication device and a base station in a wireless communication system.

According to a first aspect of embodiments herein, the object is achieved by a wireless communication device. The wireless communication device comprises a first transceiver comprising a first frequency synthesizer comprising a first digitally controlled oscillator and a crystal oscillator. The wireless communication device further comprises a second transceiver comprising a wakeup receiver, a second transmitter and a second digitally controlled oscillator connected to the wakeup receiver and the second transmitter. The wireless communication device further comprises a control unit configured to control operation of the wireless communication device. The second transmitter is configured to transmit periodically a signal to a base station. The signal is modulated by a code identifying the wireless communication device and transmitted at a frequency set by the second digitally controlled oscillator.

According to a second aspect of embodiments herein, the object is achieved by a method performed in a base station with multiple antennas. The base station receives a signal from a wireless communication device. The signal is sent at a frequency set by a digitally controlled oscillator in a wakeup transceiver comprised in the wireless communication device. The base station determines the frequency of the digitally controlled oscillator in the wakeup receiver and updates beam weights of a signal to be sent to the wireless communication device as a wakeup signal based on the received signal. The base station sends the wakeup signal to the wireless communication device at a frequency based on the determined frequency of the digitally controlled oscillator. In other words, in the wireless communication device according to the embodiments herein, the wakeup receiver is accompanied by an ultra-low power (ULP) transmitter, i.e. the second transmitter. The local oscillator, i.e. the second digitally controlled oscillator (DCO2), in the wakeup receiver is free-running to minimize power consumption, so its frequency will drift over time. The ULP transmitter is used to send out signals at frequent time intervals. These signals are modulated by a code identifying the wireless communication device. The free-running local oscillator in the wakeup receiver will be used to set the frequency of the signals transmitted from the ULP transmitter. After transmitting, the wireless communication device may use the wakeup receiver to listen for wakeup messages at the same frequency as previously used for transmitting, using the same free-running local oscillator.

At the base station side, the base-station receives the transmissions from the ULP transmitter, and it can then determine the frequency of the free-running local oscillator in the wakeup receiver. The regular transmissions provide a timing reference for the base station so that the base station will also know when the wakeup receiver is active so a message can be received. That will allow the wakeup receiver to reduce its search space, saving power as well as reducing the risk for false alarm.

The frequent and regular transmissions from the ULP transmitter allow the base station to track not only the frequency of the wireless communication device, but also beam weights for the wireless communication device. The signals from the base station may then be received by the wakeup receiver with increased strength and with less interference. Wakeup transmissions may then also be targeted with high precision to the wireless communication device, improving the signal level to the intended wireless communication device as well as reducing interference to others.

Further, by regularly getting information about the local oscillator frequency of the wireless communication device, the base station may send messages to the wakeup receiver to have its frequency adjusted, keeping it controlled without involving frequency control loops in the wireless communication device. It is also possible for the base station to alter the frequency of wakeup communication without waking up the wireless communication device.

The multiple antennas in the base station allow the weak signal from the ULP transmitter to be received by the base station. The multiple antennas also allow a stronger signal to be transmitted to the wireless communication device at wakeup, with low interference to other devices. This will increase the range of the wakeup communication, still with low wakeup power consumption. The accurately known frequency of the local oscillator in the wakeup receiver will allow the base station to send the wakeup message at a well targeted frequency, so narrow-band filters may be used in the wakeup receiver. The wakeup receiver may thus both have high sensitivity and selectivity, and at the same time use a free-running local oscillator compatible with low power consumption. Further, the high performance of the multiple antennas base station allows the second transmitter in the wakeup transceiver to have a low output power, so its power consumption may be on par with that of the wakeup receiver.

Therefore, the embodiments herein provide an improved method and apparatus for wakeup communication between a wireless communication device and a base station in a wireless communication system.

BRIEF DESCRIPTION OF THE DRAWINGS

Examples of embodiments herein are described in more detail with reference to attached drawings in which.

DETAILED DESCRIPTION

Figure 1:
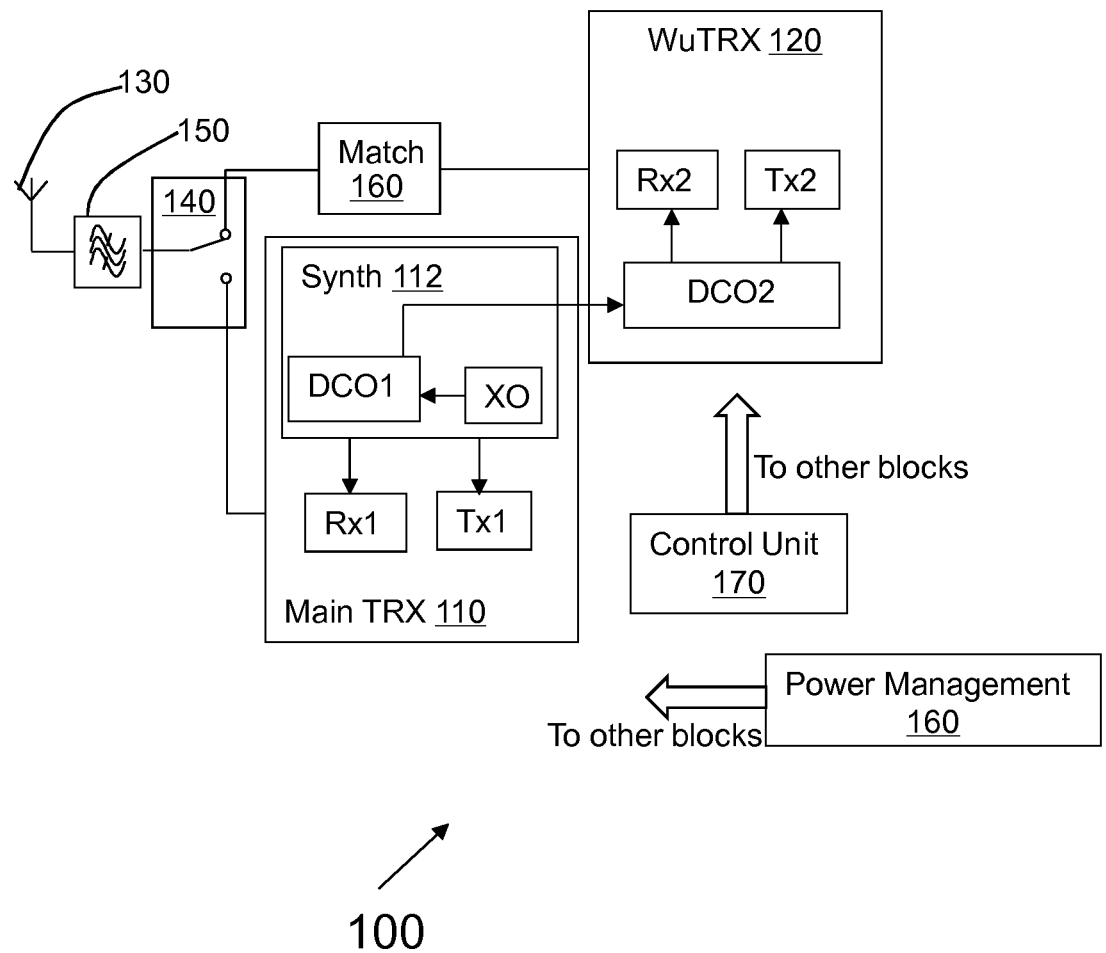
FIG. 1 is a schematic block diagram showing a wireless communication device comprising a wakeup transceiver according to the embodiments herein.

FIG. 1 shows the architecture of a wireless communication device 100 comprising a low power wakeup transceiver according to the embodiments herein.

As can be seen from FIG. 1, there are two transceivers, a first main transceiver Main TRX 110 and a second transceiver, i.e. a wakeup transceiver WuTRX 120. The first TRX 110 comprises a first receiver Rx1, a first transmitter Tx1, a first frequency synthesizer Synth 112 which comprises a first digitally controlled oscillator DCO1, and a crystal oscillator XO. The first transceiver TRX 110 is connected to an antenna 130 though an antenna switch 140 and a band select filter 150. The first receiver Rx1 and first transmitter Tx1 are connected to the first frequency synthesizer 112 which generates accurate frequencies derived from the crystal oscillator XO by using a Phase Locked Loop (PLL).

The second transceiver WuTRX 120 comprises a second receiver Rx2, i.e. a wakeup receiver and a second transmitter Tx2, i.e. a wakeup transmitter.

The WuTRX 120 is connected to the antenna 130 via a matching network 160, the antenna switch 140 and the band select filter 150. The matching network 160 up-transforms the antenna impedance to a much higher level, which increases the voltage level in the wakeup receiver Rx2 enabling increased sensitivity at low power consumption. The increased impedance also enables higher efficiency of the second transmitter Tx2 while delivering very low output power level.

The WuTRX 120 comprises a second digitally controlled oscillator DCO2 connected to the wakeup receiver Rx2 and the second transmitter Tx2. The DCO2 generates local oscillator (LO) signals. In the wakeup receiver Rx2, the local oscillator signal is connected to down-conversion mixers, and in the second transmitter Tx2, the LO signal may be connected to up-conversion mixers, or be gated on-off to directly generate an on-off keying (OOK) signal for a power amplifier comprised in the second transmitter Tx2.

The wireless communication device 100 further comprises a control unit 170 configured to control operation of the wireless communication device 100. The control unit 170 is connected to all blocks, except the band select filter 150, and controls the operation of the complete system of the wireless communication device 100 including the two transceivers. The control unit 170 also controls frequency settings for the frequency synthesizer and the second digitally controlled oscillator.

The wireless communication device 100 may further comprise a power management 160. All active blocks are connected to the power management 160 that controls if they are powered up or down.

As can be seen, the wakeup receiver Rx2 is accompanied by the second transmitter Tx2 which is an ultra-low power (ULP) transmitter. To minimize power consumption, the second digitally controlled oscillator DCO2 is free-running so its frequency will drift over time. The second transmitter Tx2 is used to send out signals at frequent time intervals. These signals will be modulated by a code identifying the wireless communication device 100. The free-running DCO2 will be used to set the frequency of the transmission.

A base station will receive the transmissions from the second transmitter Tx2, and it can then determine the frequency of the free-running DCO2. The base station will also know when the wakeup receiver Rx2 is active so a message can be received. This feature is useful when the WuTRX is not on all the time, but run in a duty-cycled mode to reduce the power consumption even further. The accurately known frequency of the wakeup receiver local oscillator DCO2 will allow the base station to send the wakeup message at a well targeted frequency.

After transmitting, the wireless communication device 100 may use the wakeup receiver Rx2 to listen for wakeup messages at the same frequency as previously used for transmitting, using the same free-running DCO2.

Therefore, according the embodiments herein, the second transmitter Tx2 is configured to periodically transmit a signal to a base station. The signal is modulated by a code identifying the wireless communication device 100 and transmitted at a frequency set by the second digitally controlled oscillator DCO2.

According to some embodiments herein, the second transceiver 120 may be configured to receive a signal from the base station using the same frequency setting for the second digitally controlled oscillator DCO2 as is used when transmitting the signal to the base station.

According to some embodiments herein, the second transceiver 120 may be further configured to receive a signal from the base station to adjust the frequency of the second digitally controlled oscillator DCO2. The second digitally controlled oscillator DCO2 has a connection to the wakeup receiver Rx2 for frequency adjustments commanded by the base station without waking up the wireless communication device. Commands may be to increase or decrease the frequency setting of the second DCO2 by a certain number of steps or a certain number of MHz. In this case, the second transceiver WuTRX 120 may be further configured to receive a signal from the base station using the adjusted frequency setting for the second digitally controlled oscillator DCO2.

There are different alternatives to calibrate or set the frequency of the second digitally controlled oscillator DCO2 before wakeup communication starts.

Figure 2:
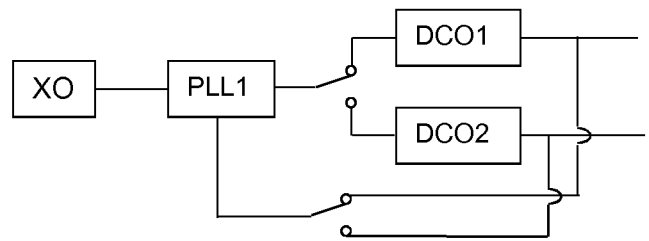
FIG. 2 (a), (b) and (c) are schematic block diagrams showing different calibration alternatives according to embodiments herein.
Figure 2:
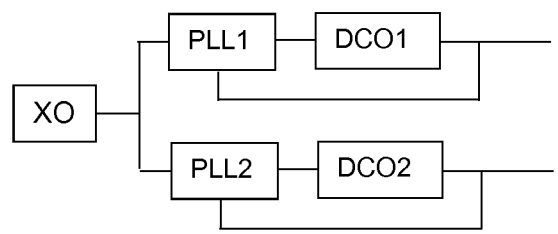
Figure 2:
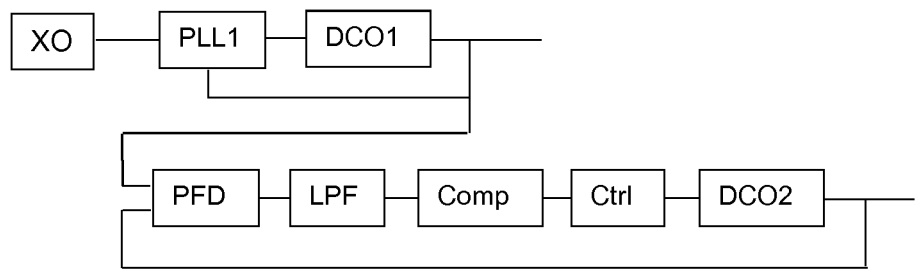

According to some embodiments herein, the frequency of the second digitally controlled oscillator DCO2 may be set by connecting the second digitally controlled oscillator DCO2 to the first frequency synthesizer 112 to tune its frequency before the first transceiver 110 is powered down. FIG. 2 (a) shows this embodiment, where a single PLL frequency synthesizer PLL1 is used. In this embodiment, the second digitally controlled oscillator DCO2 has a connection to the PLL1 in the first frequency synthesizer 112 for accurate calibration at the start of a sleeping period. In the active mode, the first digitally controlled oscillator DCO1 is connected to the PLL1 and generates an accurate frequency derived from the XO. When sleep mode is to be entered, the second digitally controlled oscillator DCO2 is instead connected to the PLL1 and will then after settling generate the same frequency as the first digitally controlled oscillator DCO1 did before. The digital control word of the second digitally controlled oscillator DCO2, i.e. the frequency setting for the second DCO2, achieved in this way is then used in the sleep mode. The second digitally controlled oscillator DCO2 is a lower power oscillator compared to the first digitally controlled oscillator DCO1, and the PLL1 as well as the first DCO1 is powered down into sleep mode after calibration.

According to some embodiments herein, the frequency of the second digitally controlled oscillator DCO2 may be set by connecting the second DCO2 to a second frequency synthesizer PLL2 to tune its frequency. The second frequency synthesizer PLL2 is connected to the crystal oscillator XO of the first frequency synthesizer 112 and is powered down when the first transceiver 110 is powered down. FIG. 2 (b) shows this embodiment, where a separate second PLL2 is used for the second DCO2 calibration. The two PLLs and the first DCO1 are powered down into sleep mode, and also the XO may then be powered down.

According to some embodiments herein, the frequency of the second digitally controlled oscillator DCO2 may be set by comparing it with the first digitally controlled oscillator DCO1 in a phase frequency detector followed by a low pass filter and a comparator. The phase frequency detector, low pass filter and comparator are powered down when the first transceiver 110 is powered down. FIG. 2 (c) shows this embodiment. The PLL1 in the first frequency synthesizer 112 operates during active mode, and then the second DCO2 is calibrated to generate the same frequency as the first DCO1. The frequencies of the two oscillators DCO1 and DCO2 are directly compared in the chain of a phase frequency detector PFD, a low pass filter LPF and a comparator Comp. The comparator will output a binary decision as to which frequency is higher. The control block Ctrl then uses this information to find a control word for the second DCO2 which minimizes the frequency difference. The control word found is then used for the second DCO2 in sleep mode, and everything else can then be powered down.

Depending on different types of the wireless communication devices, different applications and different operating modes of the wireless communication devices, the periodicity and duration to transmit a signal to the base station may be different:

a) Continuous Operation:

When the second transceiver WuTRX 120 is always on, i.e. in a continuous operation mode, the WuTRX 120 is in the receive mode as default mode, occasionally it switches to the low power transmit mode in order to allow the second transmitter Tx2 to send a signal to enable the base station determining the current frequency of the free-running oscillator DCO2 and the beam weights. After this the WuTRX 120 is switched back to receive mode.

How often the transmission for calibration is done may depend on the drift rate of the free-running oscillator and how much frequency uncertainty may be acceptable for the WuTRX 120. It may also depend on the mobility of the device, i.e. how fast it moves. The duration of the transmission for calibration, on the other hand, may either be fixed or may be made variable such that longer transmission duration is used when it is known that the channel attenuation is relatively high. Alternatively, the duration of the transmission used for calibration may also be made variable and dependent on the transmission power used for the calibration signal such that a longer duration is used when the transmission power of the calibration signal is reduced.

Therefore according to some embodiments herein, the periodicity with which to transmit a signal to a base station may be based on drift rate of the second DCO2 and frequency error tolerance of the wakeup receiver Rx2. Alternatively, the periodicity with which to transmit a signal to a base station may be based on rate of channel changes with time, i.e. how quickly the wireless channel between the wireless communication device and base station changes with time. If the channel changes faster, the periodicity with which to transmit a signal to a base station may be made shorter. The duration of the signal transmitted to a base station may be based on transmission power and channel quality.

b) Duty-Cycled Operation:

In some applications, where the sensitivity requirements are relatively high, it may not be possible to bring the power consumption down to a desirable level. When this is the case it is common to duty-cycle the wakeup receiver, i.e., the wakeup receiver will only be on for a fraction of the time so that the average power consumption is at the desirable level even if the wakeup receiver consumes more power when it is turned on. If for instance the duty-cycle is 10%, the average power consumption is roughly reduced by a factor of 10.

Therefore, according to some embodiments herein, the wakeup transceiver WuTRX 120 may be configured in an ON-OFF operating mode with a duty cycle, and the second transmitter Tx2 may be configured to transmit a signal to a base station at the beginning of each ON period. The ON period may also be referred to as ON duration or ON slot.

According to this embodiment, the selection of duty-cycling pattern is at least in part based on the need for frequency and beam weight calibration. Specifically, the low power transmit mode of the WuTRX 120 may be entered at the beginning of the ON period when duty-cycled, so that when the WuTRX 120 is turned on, it first transmits a calibration signal and then switches to receive mode. This will ensure that for that ON period the base station will have a very good estimation of the frequency of the free-running DCO2, since it may be assumed that the frequency drift during the ON period is rather small since the ON duration typically will be rather small.

In case the ON periods are short and come relatively often, e.g. 5 ms every 50 ms, it may be so that the frequency drift during the time between the ON periods, i.e. 50 ms in this example, is so small that it is not necessary to send a low power signal for calibration in every ON slot. In this case, the low power calibration signal is only sent in the beginning of a fraction of the ON slots, e.g. in one out of five or one out of ten.

So according to some embodiments herein, the wakeup transceiver WuTRX 120 may be configured in an ON-OFF operating mode with a duty cycle, and the second transmitter Tx2 is configured to transmit a signal to a base station at the beginning of every Nth ON period, where N is an integer larger than 1.

c) Bandwidth of the Wake-Up Signal

A critical part in a wakeup receiver to ensure good performance in interference limited environments is the ability to filter out adjacent channel interference (ACI). The standard way to do this is using a channel selective filter with a bandwidth similar to the bandwidth of the wakeup signal. Then it is necessary to ensure accurate frequency alignment between the wakeup signal and the wakeup receiver, since a misalignment means that the wakeup signal will not be in the passband of the channel selective filter.

However, in some cases it is possible to address this problem in an alternative way by simply transmitting a signal that is wider than the bandwidth of the receiver filter. This will mean that only part of the transmitted signal energy will be useful for the receiver, i.e. the part that falls in the passband of the receiver filter. It also means that the exact center frequency of the receiver filter is not critical, but instead it suffices that at least part of the transmitted signal falls in the passband of the receiver filter.

As an example, in IEEE 802.11ba, the bandwidth of the wakeup signal is about 4 MHz, and thus a suitable bandwidth of the receiver filter would be 4 MHz. However, the transmission of the 4 MHz wakeup signal is done in the center of a 20 MHz channel, with no signal at either side of the wakeup signal. That is, there will be 8 MHz on each side of the wakeup signal that is unused.

In this case, one may in principle transmit a 20 MHz wakeup signal instead of a 4 MHz wakeup signal. As long as the frequency error in the wakeup receiver does not exceed 8 MHz, the wakeup receiver will receive a 4 MHz useful signal.

According to this embodiment, the fact that the available channel bandwidth is much wider than the signal bandwidth may be exploited by deliberately sending a wakeup signal with wider bandwidth. This allows for relaxed requirements on the frequency accuracy in the wakeup receiver. Specifically, if and how often a low power calibration signal is transmitted will at least be determined on how much wider the wakeup signal to be sent can be made compared to the receiver filter.

Therefore according to some embodiments herein, the periodicity with which to transmit a signal to a base station may be based on the bandwidth of a wakeup signal to be sent by the base station and the bandwidth of a channel selective filter in the wakeup receiver Rx2.

How often the WuTRX 120 switches to transmit mode, i.e. the periodicity with which to transmit a signal to the base station, and how long the transmission lasts, i.e. the duration of the transmission, may be negotiated or communicated using the main transceiver TRX110. When duty-cycling is used, the exact pattern for when the wakeup receiver will be on is typically known by the base station so that a wakeup signal is only sent when the wakeup receiver Rx2 will be on. The negotiation and decision of a suitable duty-cycling pattern may also be done using the wakeup transceiver WuTRX 120.

Therefore, according to some embodiments herein, the first transceiver TRX 110 may be configured to send a signal to the base station before powered down, to indicate the transmission schedule and transmission code of the signal to be sent by the second transceiver WuTRX 120.

Figure 3:
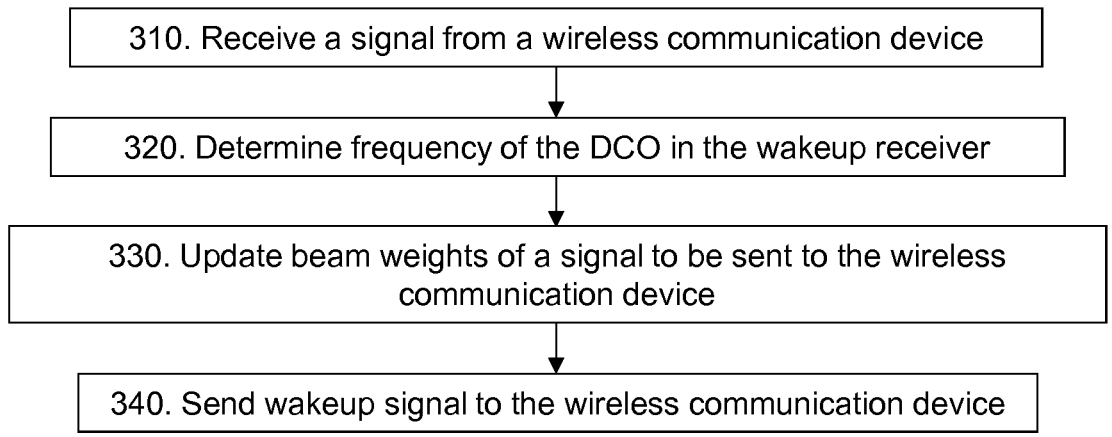
FIG. 3 is a flow chart illustrating a method performed in a base station according to embodiments herein.

A method performed in a base station with multiple antennas for sending a signal to a wireless communication device will be described with reference to FIG. 3. The method comprises the following actions which may be performed in any suitable order.

Action 310

The base station receives a signal from a wireless communication device. The signal is sent at a frequency set by a DCO in a wakeup transceiver comprised in the wireless communication device.

The signal sent from the wireless communication device is a ULP signal. In order to receive the ULP signal, the base station may use multiple antennas. The received signals at the multiple antennas are converted to baseband and then combined in phase for high sensitivity, and for suppression of noise and interference coming from other directions. So according to some embodiments herein, the base station may combine signals received from the multiple antennas in phase.

For the base station to be able to find the transmitted signal and to be synchronized, when the wireless communication device is entering sleep-mode, it may use its main transceiver to agree with the base-station on a ULP transmission schedule and transmission code. For example, as described above, the wireless communication device may send a signal to the base station before powered down, to indicate the transmission schedule and transmission code of the signal to be sent by the second transceiver WuTRX 120 in the wireless communication device.

Action 320

The base station determines the frequency of the DCO in the wakeup receiver. The free-running DCO in the wakeup receiver may be initially calibrated to the frequency used by the main transceiver in the wireless communication device. So the ULP signal is transmitted using the same frequency as the main transceiver. This will allow the base station to track the frequency of the wireless communication device over time from this initial point.

Action 330

The frequent and regular transmissions from the wireless communication device allow the base-station to track not only its frequency, but also beam weights for the wireless communication device.

The base station updates beam weights of a signal to be sent to the wireless communication device as a wakeup signal based on the received signal from the wireless communication device. It is based on the received signal phase and amplitude at each antenna element. Beam weights may be determined by correlation between the baseband signals from each antenna element and the combined received baseband signal. So from the received signal, the base station may also track the movement of the wireless communication device. The beam weights may be updated such that signal power and direction are based on the movement of the wireless communication device. The signals from the base station may then be received by the wakeup receiver with increased strength and with less interference. Wakeup transmissions may then also be targeted with high precision to the wireless communication device, improving the signal level to the intended wireless communication device as well as reducing interference to others.

Action 340

The base station sends the wakeup signal to the wireless communication device at a frequency based on the determined frequency of the DCO.

The base station may send the wakeup signal at the same frequency as the frequency of the DCO.

The base station may send the wakeup signal at a frequency offset from the frequency of the DCO.

According to some embodiments herein, the base station may send the wakeup signal to the wireless communication device based on receiving time of the received signal such that the wakeup signal is sent after a pre-determined time from the receiving time.

The regular transmissions provide a timing reference for the base station wakeup message transmission. That will allow the wakeup receiver to reduce its search space, saving power as well as reducing the risk for false alarm.

According to some embodiments herein, the base station may further send a signal to the wireless communication device to facilitate frequency adjusting of the DCO in the wakeup transceiver. By regularly getting information about the wireless communication device local oscillator frequency, the base-station can send messages to the wakeup receiver to have the frequency adjusted, keeping it controlled without involving frequency control loops in the wireless communication device. It is also possible for the base station to alter the frequency of the wake-up communication without waking up the wireless communication device.

Figure 4:
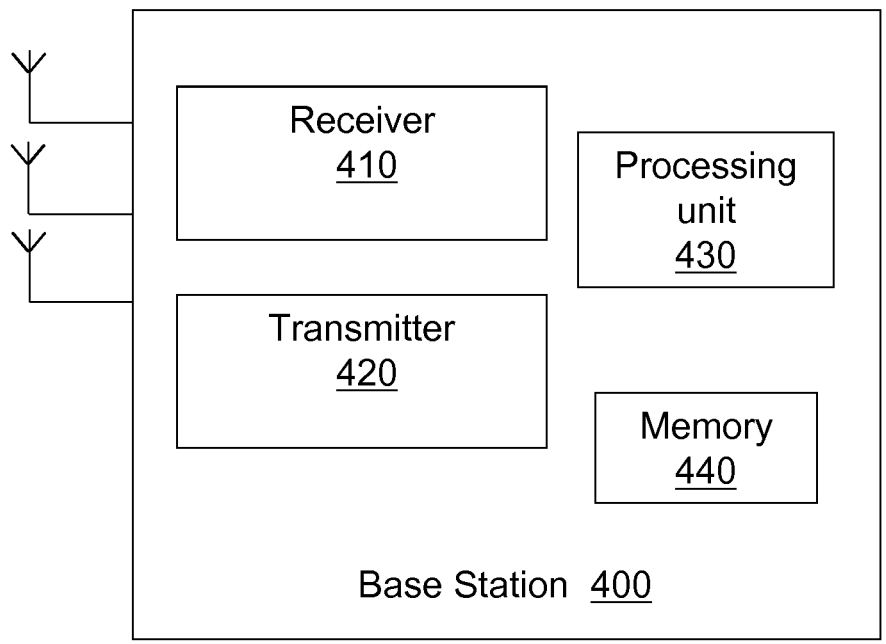
FIG. 4 is a schematic block diagram illustrating an embodiment of a base station with multiple antennas.

FIG. 4 shows a block diagram of a base station 400 with multiple antennas. The base station 400 comprises e.g. a receiver 410, a transmitter 420, a processing unit 430, a memory 440 etc. to perform the method Actions 310-340 described with reference to FIG. 3.

To summarize, the embodiments herein provide a low power wireless communication device that features both a wakeup receiver and an ultra-low power (ULP) transmitter. The ULP transmitter sends out messages that allow the base station to track the frequency of its free-running local oscillator, which is also used for the wakeup receiver. The accurately known frequency of the wakeup receiver local oscillator will allow the base station to send the wakeup message at a well targeted frequency. This allows a more narrow bandwidth and hence sensitive and selective wakeup receiver, while still using a free-running oscillator with extremely low power consumption. The messages from the ultra-low power transmitter also allow the base station to update beam weights of a multiple antenna arrangement, to increase signal to noise and interference ratio for wakeup communication in both directions. The messages from the ultra-low power transmitter will also provide timing information that may be used to reduce wakeup receiver power and false alarm rate. The base station may also control the frequency of the wakeup receiver, by sending signals commanding the wireless communication device to update its local oscillator frequency, without waking it up.

The multiple antennas allow the weak signal from the wireless communication device to be received by the base station, and they also allow a stronger signal to be transmitted to the wireless communication device at wakeup, with low interference to other devices. This will increase the range of the system, still with low wakeup power consumption. The high performance of the multiple antenna base station allows the transmitter in the wakeup transceiver of the communication device to have a low output power, so its power consumption can be on par with that of the wakeup receiver.

To assess how the overall energy consumption is affected by the proposed architecture, it is reasonable to assume that a PLL consumes a few hundred uW. With the proposed solution, the need for a PLL is avoided, instead a second transmitter with low power is needed. The second transmitter may be designed to consume less than 100 uW, if a transmit power of −20 dBm (10 uW) may suffice. Even if the transmit power may increase to, e.g. −15 dBm (30 uW), the total power consumption of the second transmitter may still be considerably less than for the PLL.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A wireless communication device comprising:
    a first transceiver comprising a first frequency synthesizer which comprises a first digitally controlled oscillator and a crystal oscillator;
    a second transceiver comprising a wakeup receiver, a second transmitter and a second digitally controlled oscillator connected to the wakeup receiver and second transmitter; and
    a control unit configured to control operation of the wireless communication device;
    wherein the second transmitter is configured to transmit periodically a signal to a base station, the signal is modulated by a code identifying the wireless communication device and transmitted at a frequency set by the second digitally controlled oscillator.

2. The wireless communication device according to claim 1, wherein the frequency of the second digitally controlled oscillator is set by connecting the second digitally controlled oscillator to the first frequency synthesizer to tune its frequency before the first transceiver is powered down.

3. The wireless communication device according to claim 1, wherein the frequency of the second digitally controlled oscillator is set by connecting the second digitally controlled oscillator to a second frequency synthesizer to tune its frequency, the second frequency synthesizer is connected to the crystal oscillator of the first frequency synthesizer and is powered down when the first transceiver is powered down.

4. The wireless communication device according to claim 1, wherein the frequency of the second digitally controlled oscillator is set by comparing it with the first digitally controlled oscillator in a phase frequency detector followed by a low pass filter and a comparator, the phase frequency detector, low pass filter and comparator are powered down when the first transceiver is powered down.

5. The wireless communication device according to claim 1, wherein the periodicity with which to transmit a signal to a base station is based on drift rate of the second digitally controlled oscillator and a frequency error tolerance of the wakeup receiver.

6. The wireless communication device according to claim 1, wherein the periodicity with which to transmit a signal to a base station is based on rate of wireless channel changes with time between the wireless communication device and the base station.

7. The wireless communication device according to claim 1, wherein the transmission duration of the signal to a base station is based on transmission power and channel quality.

8. The wireless communication device according to claim 1, wherein the wakeup receiver is configured in an ON-OFF operating mode with a duty cycle, and the second transmitter is configured to transmit a signal to a base station at the beginning of each ON period.

9. The wireless communication device according to claim 1, wherein the wakeup receiver is configured in an ON-OFF operating mode with a duty cycle, and the second transmitter is configured to transmit a signal to a base station at the beginning of every Nth ON period, where N is an integer larger than 1.

10. The wireless communication device according to claim 1, wherein the periodicity with which to transmit a signal to a base station is further based on the bandwidth of a wakeup signal to be sent by the base station and the bandwidth of a channel selective filter in the wakeup receiver.

11. The wireless communication device according to claim 1, wherein the second transceiver is further configured to receive a signal from the base station using the same frequency setting for the second digitally controlled oscillator as is used when transmitting the signal to the base station.

12. The wireless communication device according to claim 1, wherein the second transceiver is further configured to receive a signal from the base station to adjust the frequency of the second digitally controlled oscillator.

13. The wireless communication device according to claim 12, wherein the second transceiver is further configured to receive a signal from the base station using the adjusted frequency setting for the second digitally controlled oscillator.

14. The wireless communication device according to claim 1, wherein the first transceiver is configured to send a signal to the base station before powered down, to indicate the transmission schedule and transmission code of the signal to be sent by the second transceiver.

* * * * *